(12) United States Patent
Rebbapragada et al.

(10) Patent No.: US 9,372,905 B2
(45) Date of Patent: Jun. 21, 2016

(54) SUBROUTINES IN A GRAPHICAL QUERY BUILDER

(71) Applicant: Verizon Patent and Licensing Inc., Basking Ridge, NJ (US)

(72) Inventors: Surya Rebbapragada, Irving, TX (US); Arockia R. Jeyaraj, Irving, TX (US); Thuy X. Nguyen, Plano, TX (US); Srinivas S. Halembar, Irving, TX (US); Yogesh Sawant, Irving, TX (US); Ibrahim Itani, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 206 days.

(21) Appl. No.: 14/099,287

(22) Filed: Dec. 6, 2013

(65) Prior Publication Data

US 2015/0161240 A1  Jun. 11, 2015

(51) Int. Cl.
*G06F 7/00* (2006.01)
*G06F 17/00* (2006.01)
*G06F 17/30* (2006.01)

(52) U.S. Cl.
CPC .... *G06F 17/30572* (2013.01); *G06F 17/30398* (2013.01)

(58) Field of Classification Search
CPC .............. G06F 17/30873; G06F 17/30651; G06F 17/30398; G06F 17/30539; G06F 17/30572
See application file for complete search history.

(56) References Cited

U.S. PATENT DOCUMENTS

| | | | |
|---|---|---|---|
| 7,358,502 B1 * | 4/2008 | Appleby et al. | 250/370.14 |
| 2006/0085750 A1 * | 4/2006 | Easton et al. | 715/708 |
| 2007/0094060 A1 * | 4/2007 | Apps et al. | 705/7 |
| 2011/0276585 A1 * | 11/2011 | Wagner et al. | 707/769 |
| 2012/0265744 A1 * | 10/2012 | Berkowitz et al. | 707/705 |
| 2012/0330869 A1 * | 12/2012 | Durham | 706/16 |

* cited by examiner

*Primary Examiner* — Susan Chen

(57) ABSTRACT

A system may determine metadata information associated with data included in a data structure. The system may identify a category, associated with the data, based on the metadata information. The system may present, for display, a user interface that allows a user to build a graphical query based on the category. The graphical query may include a user-defined visual representation of a data structure query associated with the data. The system may receive information associated with the graphical query based on presenting the user interface. The information associated with the graphical query may be received based on input provided via the user interface, and may include information associated with the category. The system may provide the information associated with the graphical query.

20 Claims, 15 Drawing Sheets

100 ⟶

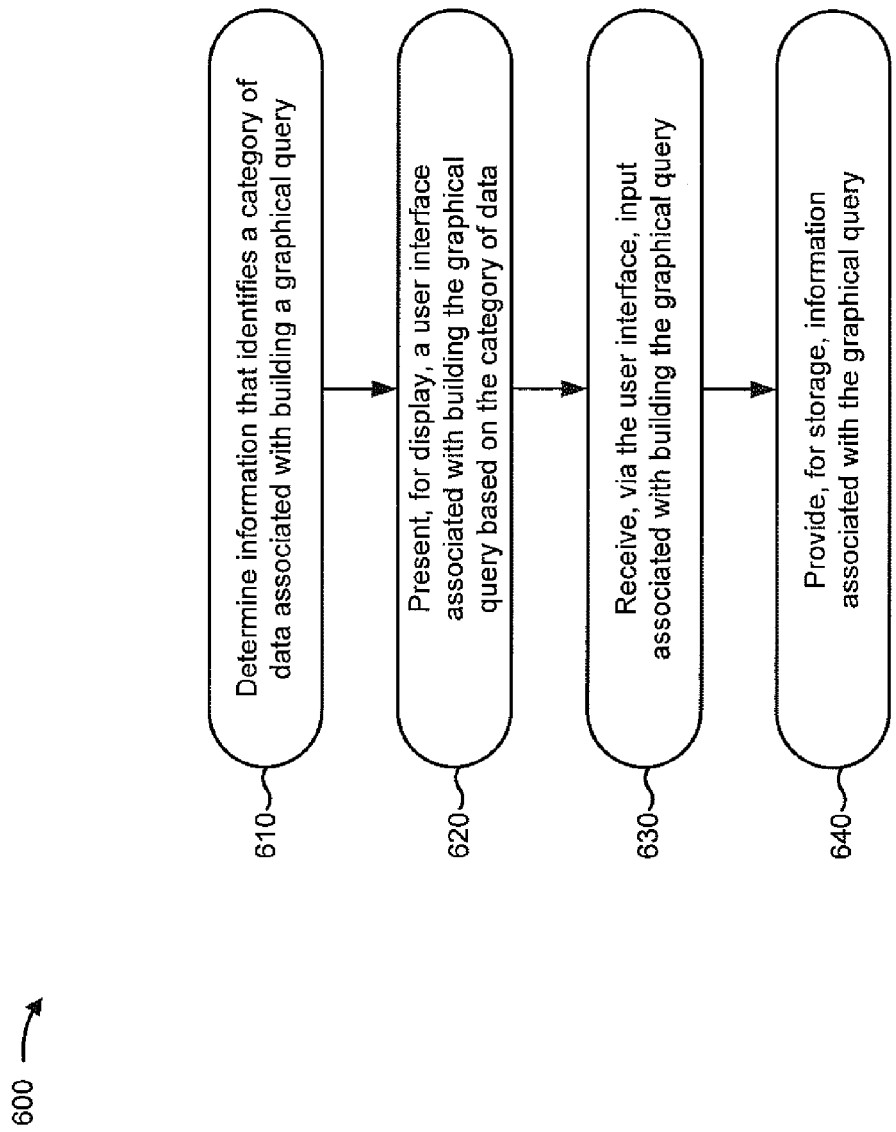

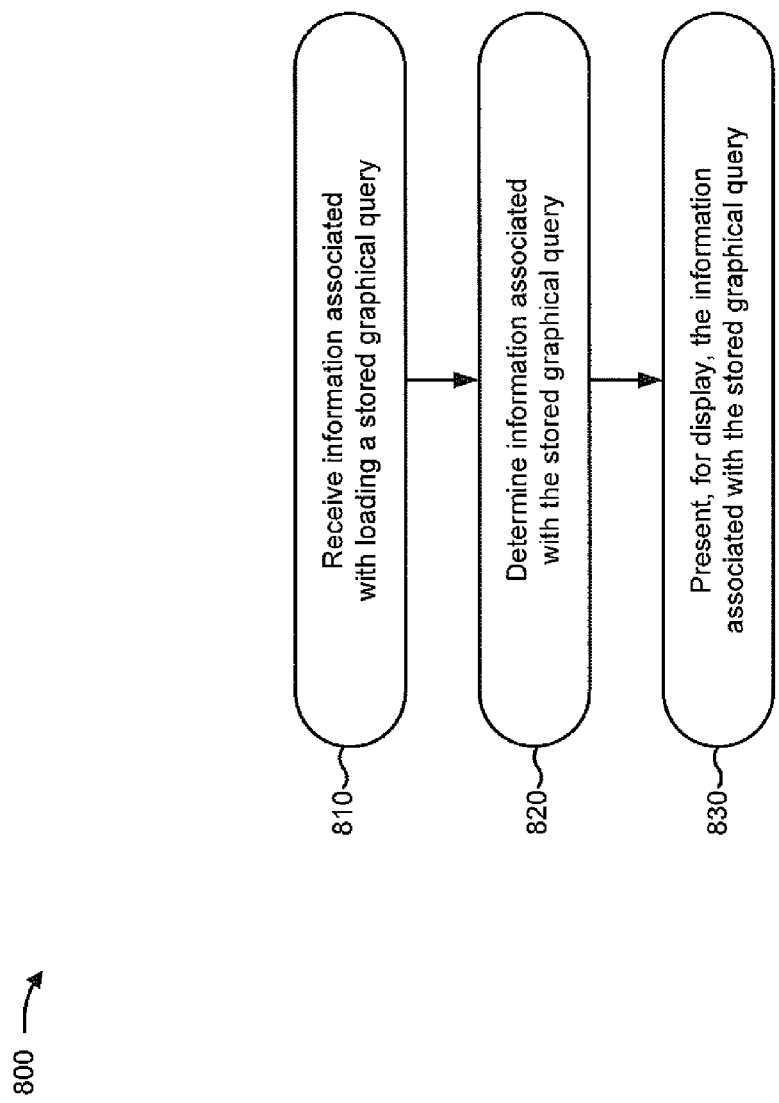

SUBROUTINES IN A GRAPHICAL QUERY BUILDER

BACKGROUND

A database may include an organized collection of data that is stored by a device. A user, associated with the device, may determine particular data included in the database using a database query. The database query may be constructed (e.g., using structure query language ("SQL")) and provided to the device, such that the device may provide, to the user, the particular data that is responsive to the database query.

BRIEF DESCRIPTION OF THE DRAWINGS

FIG. 6 is a flow chart of an example process for receiving and storing information associated with a graphical data structure query that is based on a category of data included in a data structure;

FIG. 8 is a flow chart of an example process for determining and displaying information associated with a stored graphical query.

DETAILED DESCRIPTION

The following detailed description of example implementations refers to the accompanying drawings. The same reference numbers in different drawings may identify the same or similar elements.

A group of data structures (e.g., data structures, where each data structure includes data) may be stored in one or more storage locations by one or more server devices. A user (e.g., associated with a user device) may wish to determine a particular portion of data that may be included in the group of data structures (e.g., the particular portion of data may be scattered throughout the group of data structures). One method for determining the particular data sought by the user is to generate a data structure query that, when provided to the one or more server devices, may allow the user to receive (e.g., via the user device) the particular data (e.g., the data that is responsive to the query). However, the user may be unable to generate program code associated with the data structure query (e.g., when the user is unfamiliar with writing program code for a data structure query). As such, the user may wish to generate (e.g., via the user device) the data structure query without providing the program code associated with the data structure query. Implementations described herein may allow a user to generate (e.g., via a user device) a graphical data structure query without requiring the user to generate program code associated with the data structure query. Implementations described herein may also allow the graphical data structure query to be stored (e.g., such that the graphical data structure query may be retrieved, modified, performed, etc. at a later time).

The description to follow will focus on data stored in databases. Implementations, described herein, are not limited to databases and equally apply to other forms of data structures, such as tables, linked lists, etc.

Figure 1A:
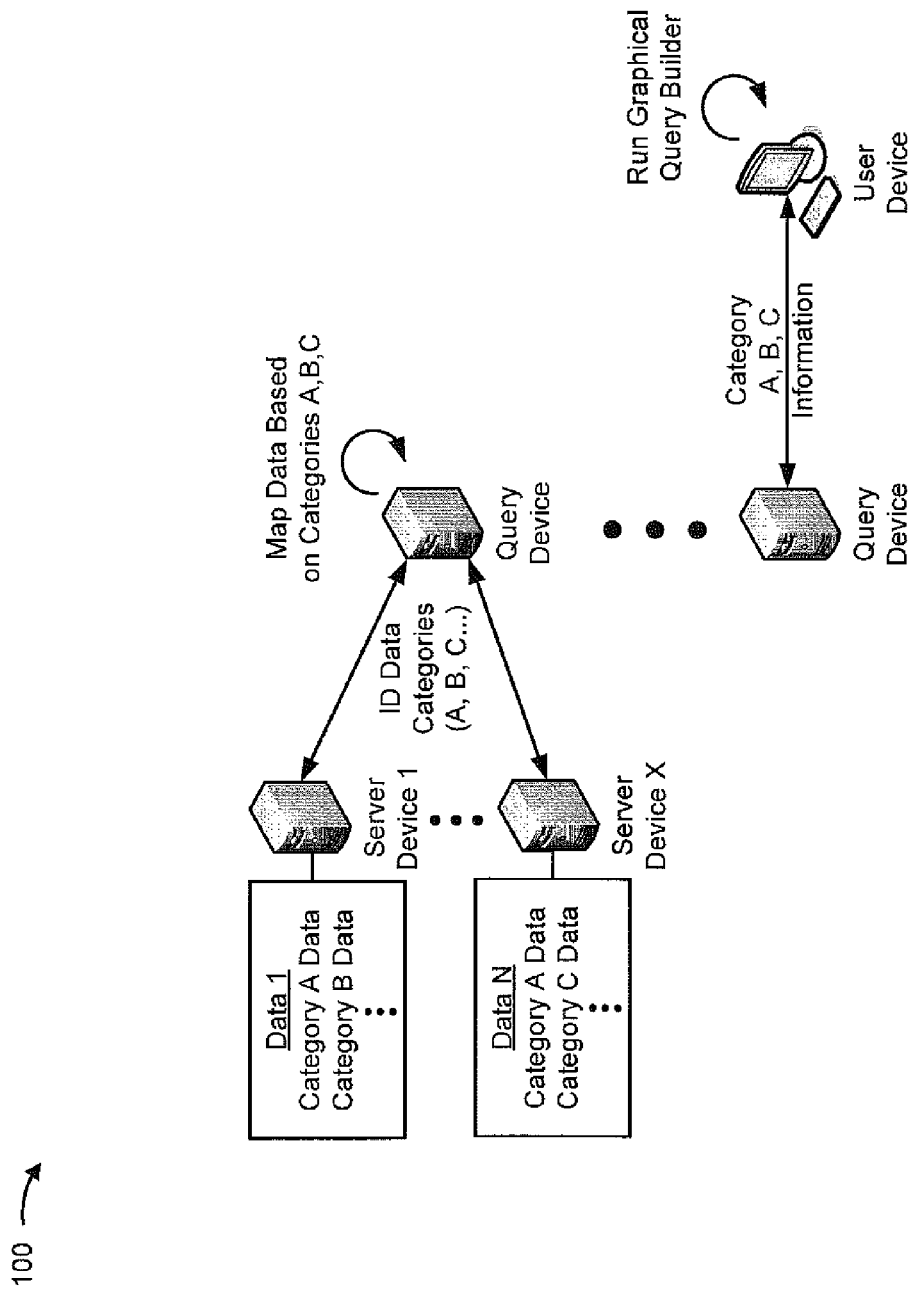
FIGS. 1A-1C are diagrams of an overview of an example implementation described herein.
Figure 1B:
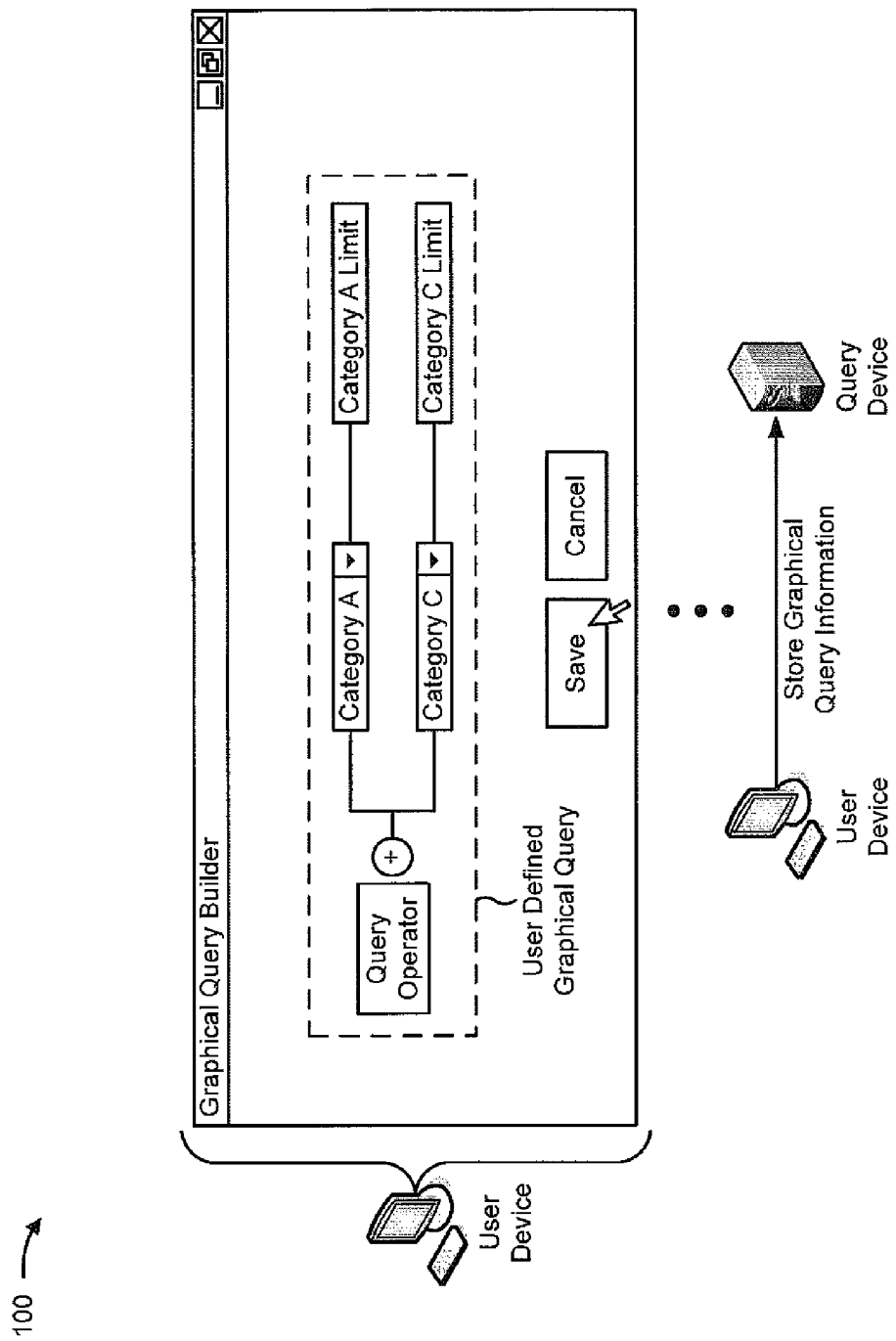
Figure 1C:
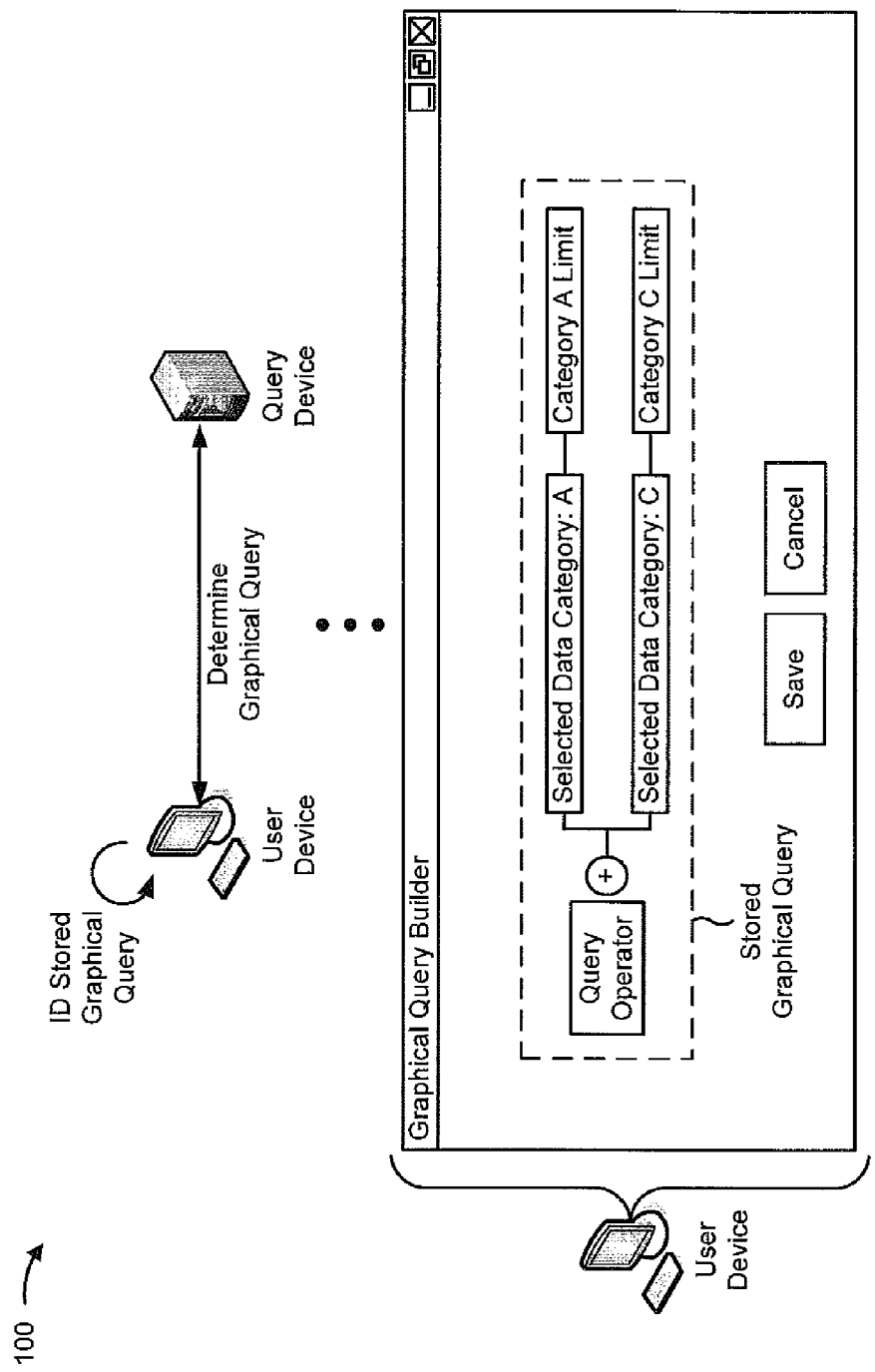

FIGS. 1A-1C are diagrams of an overview of an example implementation 100 described herein. For the purposes of example implementation 100, assume that a set of server devices 1 though X (X>1) store a set of databases 1 through N (N>1). Further, assume that a user device wishes to query the N databases in order to receive particular information that may be stored in one or more of the N databases. Finally, assume that a query device is configured to communicate with the X server devices and the user device regarding a database query.

As shown in FIG. 1A, each of the N databases may include one or more categories of data (e.g., category A data, category B data, category C data, etc.). As further shown, the query device may identify that the N databases include category A data, category B data, and category C data, may store information that identifies each category, and may store mapping information associated with the data based on each category (e.g., such that data, associated with a particular category, may be retrieved at a later time based on a query associated with the category).

As further shown in FIG. 1A, the user device may execute a graphical query builder application (e.g., an application installed on the user device that allows the user to generate a visual representation of a database query). As shown, the user device may determine (e.g., based on the information, stored by the query device, indicating that the N databases include category A data, category B data, and category C data) that the graphical query may be built based on category A data, category B data, and category C data.

As shown in FIG. 1B, the user device may display a user interface that allows the user to build a graphical query based on one or more of the categories of data (e.g., category A, category B, category C). As further shown, the user may provide (e.g., via the user interface) input associated with building the graphical query (e.g., without inputting program code). As further shown, the user may indicate that the user wishes to save the graphical query, the user device may provide information associated with the graphical query to the query device, and the query device may store the information associated with the graphical query.

For the purposes of FIG. 1C, assume that a user, associated with the user device, wishes to retrieve a stored graphical query (e.g., a graphical query that has already been built by the user). As shown in FIG. 1C, the user device may identify (e.g., based on input from the user) the stored graphical query, and may determine information associated with the graphical query based on the information that identifies the graphical query and information stored by the query device (e.g., when the query device stores the information associated with the stored graphical query). As further shown, the user device may display the graphical query (e.g., such that the user may modify the graphical query, such that the user may add the graphical query to another graphical query, such that the graphical query may be performed, etc.).

In this way, a user, associated with a user device, may provide, via a user interface, graphical information associated with a database query, such that the user is not required to generate program code associated with the database query. Furthermore, the graphical information associated with the database query may be stored (e.g., such that the graphical query may be displayed and used, modified, altered, etc. at a later time).

Figure 2:
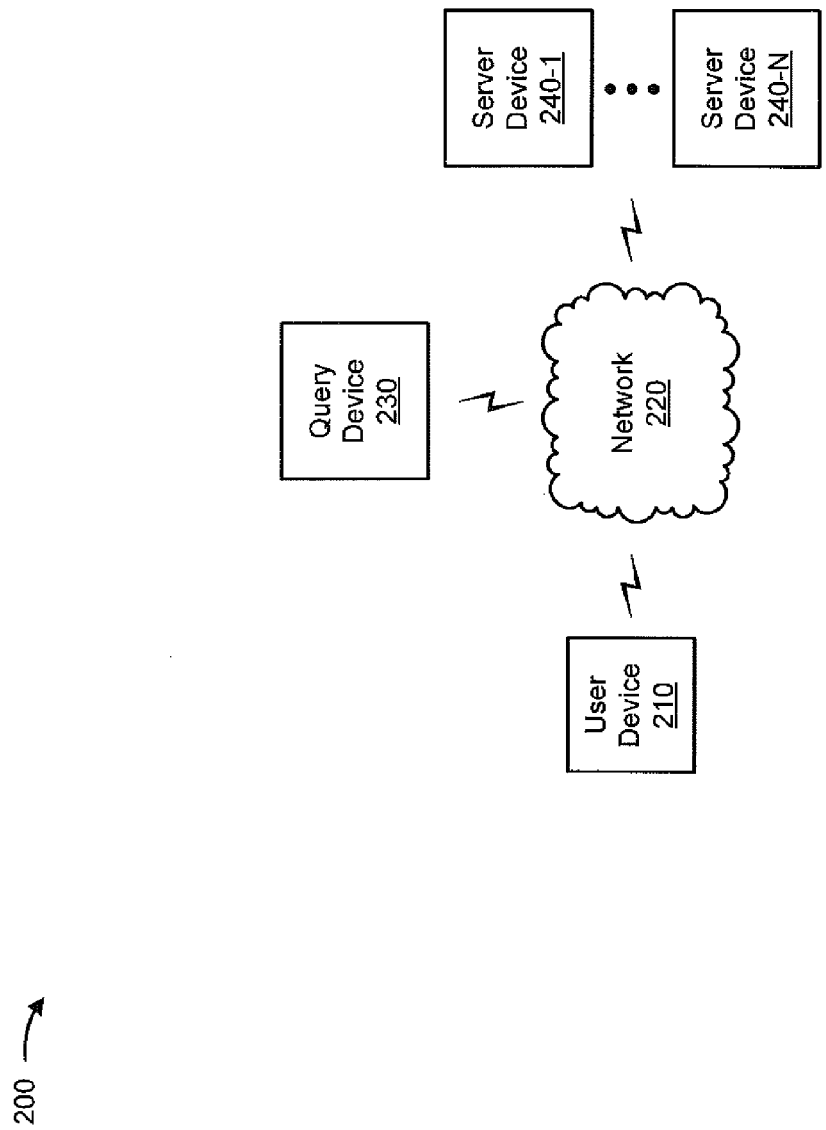
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a user device 210, a network 220, a query device 230, and a set of server devices 240-1 through 240-N (N>1) (hereinafter collectively referred to as "server devices 240," and individually as "server device 240").

User device 210 may include one or more devices capable of communicating with other devices (e.g., query device 230, server device 240, etc.) via a network (e.g., network 220), and/or capable of receiving information provided by another device (e.g., query device 230). For example, user device 210 may include a wired communication device, a wireless communication device, a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a desktop computer, a laptop computer, a tablet computer, or a similar type of device. In some implementations, user device 210 may be capable of receiving, storing, executing, and/or processing information associated with building a graphical query associated with query device 230 and/or server device 240. Additionally, or alternatively, user device 210 may be capable of executing, hosting, and/or managing a graphical query builder application that allows a user to provide input (e.g., via a touch screen, via a keyboard, etc.), associated with building the graphical query.

Network 220 may include one or more wired and/or wireless networks. For example, network 220 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. In some implementations, network 220 may allow communication between devices, such as user device 210, query device 230, and/or server device 240.

Query device 230 may include a device, such as a server, capable of receiving, sending, processing, and/or storing information associated with a graphical query associated with a database stored by server device 240. In some implementations, query device 230 may host and/or execute applications and/or services, such as a graphical query builder application service, and may provide such services to user device 210. For example, server device 240 may include an application server. In some implementations, server device 240 may be capable of receiving, from server device 240, metadata information, and identifying a category associated with the metadata information. Additionally, or alternatively, query device 230 may be capable of generating and/or storing mapping information associated with the metadata information and the category (e.g., such that query device 230 may retrieve data, associated with the metadata information, based on the category).

Server device 240 may include a device capable of receiving, sending, processing, and/or storing information associated with a database. For example, server device 240 may include a server device. In some implementations, server device 240 may be capable of receiving, sending, and/or storing metadata information associated with a category of data that may be used, by a user of user device 210, to build a graphical query. Additionally, or alternatively, server device 240 may be capable of providing data (e.g., included in a database) to query device 230 and/or user device 210.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
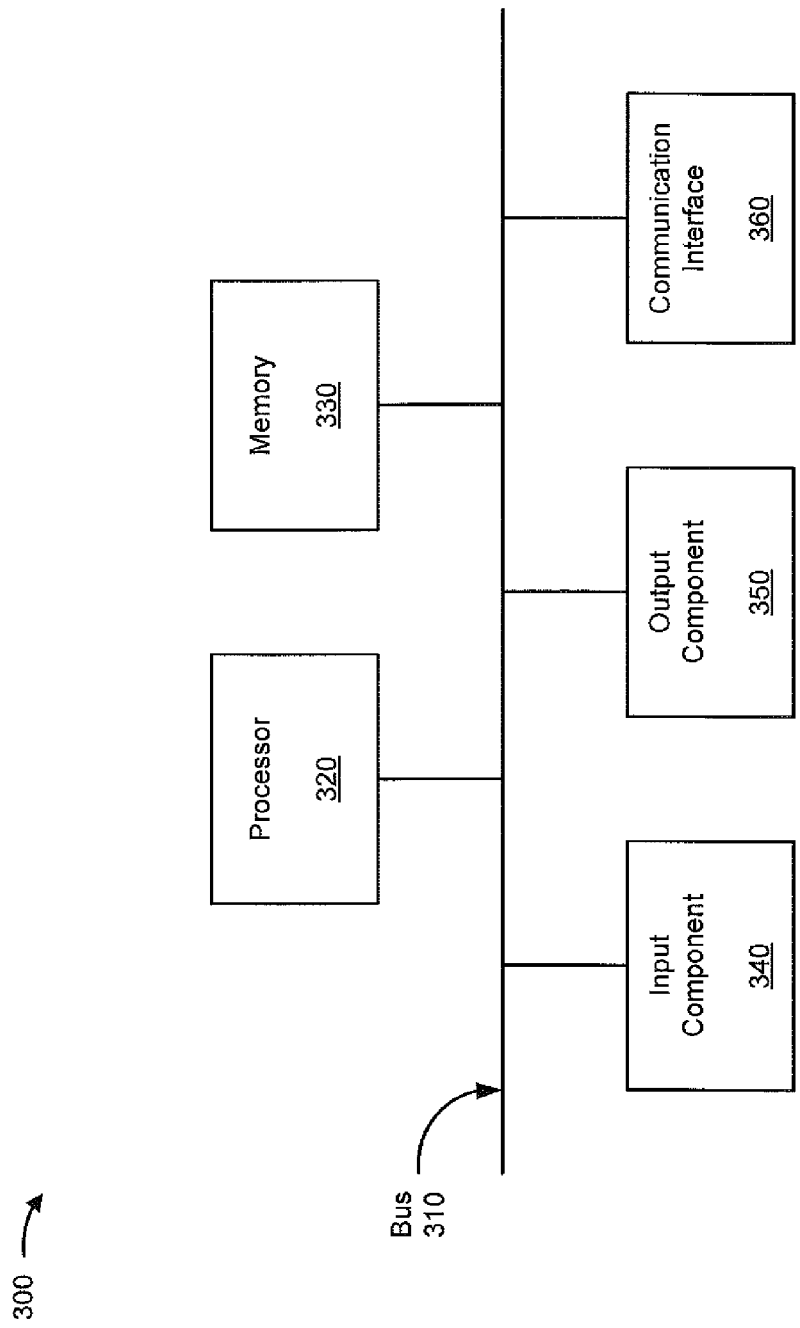
FIG. 3 is a diagram of example components of one or more devices of FIG. 2.

FIG. 3 is a diagram of example components of a device 300. Device 300 may correspond to user device 210, query device 230, and/or server device 240. Additionally, or alternatively, each of user device 210, query device 230, and/or server device 240 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
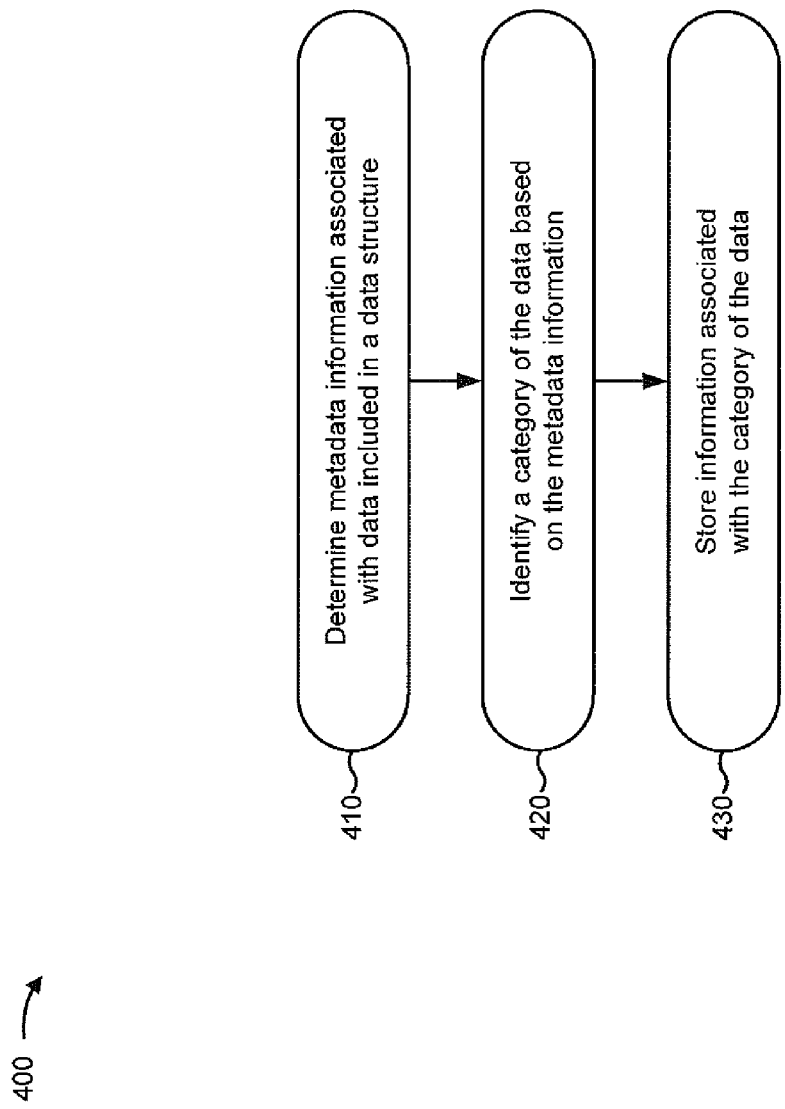
FIG. 4 is a flow chart of an example process for storing information associated with a category of data included in a data structure.

FIG. 4 is a flow chart of an example process 400 for storing information associated with a category of data included in a data structure. In some implementations, one or more process blocks of FIG. 4 may be performed by query device 230. In some implementations, one or more process blocks of FIG. 4 may be performed by another device or a group of devices separate from or including query device 230, such as user device 210 and/or server device 240.

As shown in FIG. 4, process 400 may include determining metadata information associated with data included in a data structure (block 410). For example, query device 230 may determine metadata information associated with data included in a database stored by server device 240. In some implementations, query device 230 may determine the metadata information when server device 240 provides the metadata information (e.g., when the metadata information is stored by server device 240 and server device 240 provides the metadata information). Additionally, or alternatively, query device 230 may determine the metadata information when query device 230 requests the metadata information (e.g., from server device 240).

Metadata information may include information, associated with data included in a database, that may be used to identify a category of the data. For example, the metadata information may include a name of a field included in the database, a name of a table included in the database, a type of data included in the database (e.g., a string, an integer, a date, etc.), a lookup table associated with the database, or another type of information associated with the data. In some implementations, the metadata information may be used by query device 230 to identify a category associated with the data (e.g., such that query device 230 may categorize portions of data from one or more databases into a group of categories based on the metadata information).

In some implementations, query device 230 may determine the metadata information based on information received from server device 240. For example, query device 230 may send, to server device 240, a request to provide the metadata information (e.g., associated with a database), and server device 240 may provide the metadata information to query device 230.

Additionally, or alternatively, query device 230 may determine the metadata information based on information received from user device 210. For example, query device 230 may receive, from user device 210, information indicating that query device 230 is to retrieve the metadata information (e.g., when a user of user device 210 wishes to build a graphical query), and query device 230 may retrieve the metadata information from server device 240.

Additionally, or alternatively, query device 230 may determine the metadata information at a particular interval of time (e.g., when query device 230 is configured to request metadata information every two days, every hour, etc.). Additionally, or alternatively, query device 230 may determine the metadata information based on server device 240 updating data included in a database (e.g., when server device 240 is configured to provide updated metadata information to query device 230 each time data, included in a database stored by server device 240, is updated, altered, modified, etc.).

As further shown in FIG. 4, process 400 may include identifying a category of the data based on the metadata information (block 420). For example, query device 230 may identify a category of the data, stored by server device 240, based on the metadata information, associated with the data, received by query device 230. In some implementations, query device 230 may identify the category of the data when query device 230 receives the metadata information associated with the data (e.g., after server device 240 provides the metadata information). Additionally, or alternatively, query device 230 may identify the category of the data when query device 230 receives information, indicating that query device 230 is to identify the category of the data, from another device (e.g., user device 210, server device 240, etc.).

A category of data may include a group of data regarded as having a shared characteristic. In some implementations, query device 230 may identify a category, associated with data included in a database, based on the metadata information associated with the data. For example, a field name (e.g., "cost") associated with data included in a first database (e.g., that identifies a first set products) may be used to identify that the field includes data associated with a particular category (e.g., product cost). Similarly, a field name (e.g., "cost") associated with data included in a second database (e.g., that identifies a second set of products) may be used to identify that the field also includes data associated with the particular category (e.g., product cost).

In some implementations, query device 230 may identify a group of categories associated with a database. For example, query device 230 may receive metadata information associated with data included in a database, and query device 230 may determine that the database includes data associated with multiple categories (e.g., more than one category of data may be included in a single database). Additionally, or alternatively, query device 230 may identify a category of data as being included in a group of databases. For example, query device 230 may receive metadata information associated with data stored in group of databases (e.g., stored by a group of server devices 240), and query device 230 may determine that the group of databases includes information associated with a particular category (e.g., more than one database may include data associated with a single category).

In some implementations, query device 230 may identify a category and a sub-category of the data based on the metadata information. For example, query device 230 may receive metadata information associated with a portion of data that identifies a particular characteristic (e.g., a first name of a customer), and query device 230 may identify a category of the data (e.g., personal information) and a sub-category of the category of the data (e.g., first name) based on the metadata information.

In some implementations, query device 230 may identify the category of data to allow query device 230 to provide, to user device 210, information that identifies the category of data such that the user of user device 210 may build a graphical query (e.g., using a graphical query builder application), associated with one or more databases, based on the category of data.

As further shown in FIG. 4, process 400 may include storing information associated with the category of the data (block 430). For example, query device 230 may store information associated with the category of the data. In some implementations, query device 230 may store the information associated with the category of the data when query device 230 identifies the category of the data (e.g., after query device 230 identifies the category based on the metadata information). Additionally, or alternatively, query device 230 may store information associated with the category of the data when query device 230 receives information, indicating that query device 230 is to store the information associated with the category of the data, from another device (e.g., user device 210, server device 240, etc.).

In some implementations, query device 230 may store the information associated with the category of the data in a memory location (e.g., a RAM, a hard disk, etc.) query device 230. Additionally, or alternatively, query device 230 may store the information associated with the category of the data in a memory location associated with a graphical query builder application (e.g., such that query device 230 may provide the information to user device 210 when the user wishes to build a graphical query based on the category of the data).

In some implementations, query device 230 may store information (e.g., data mapping information), associated with the category of the data, that may allow query device 230 to determine a response to a graphical query at a later time. For example, query device 230 may identify a category of data included in a database, and may store data mapping information that allows query device 230 to read the data, based on identifying the data as being associated with the category, when query device 230 determines a response to a graphical query (e.g., received from user device 210). In this way, query device 230 may perform the graphical query without duplicating the data stored in the database (e.g., the data may be mapped based on the category).

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5A:
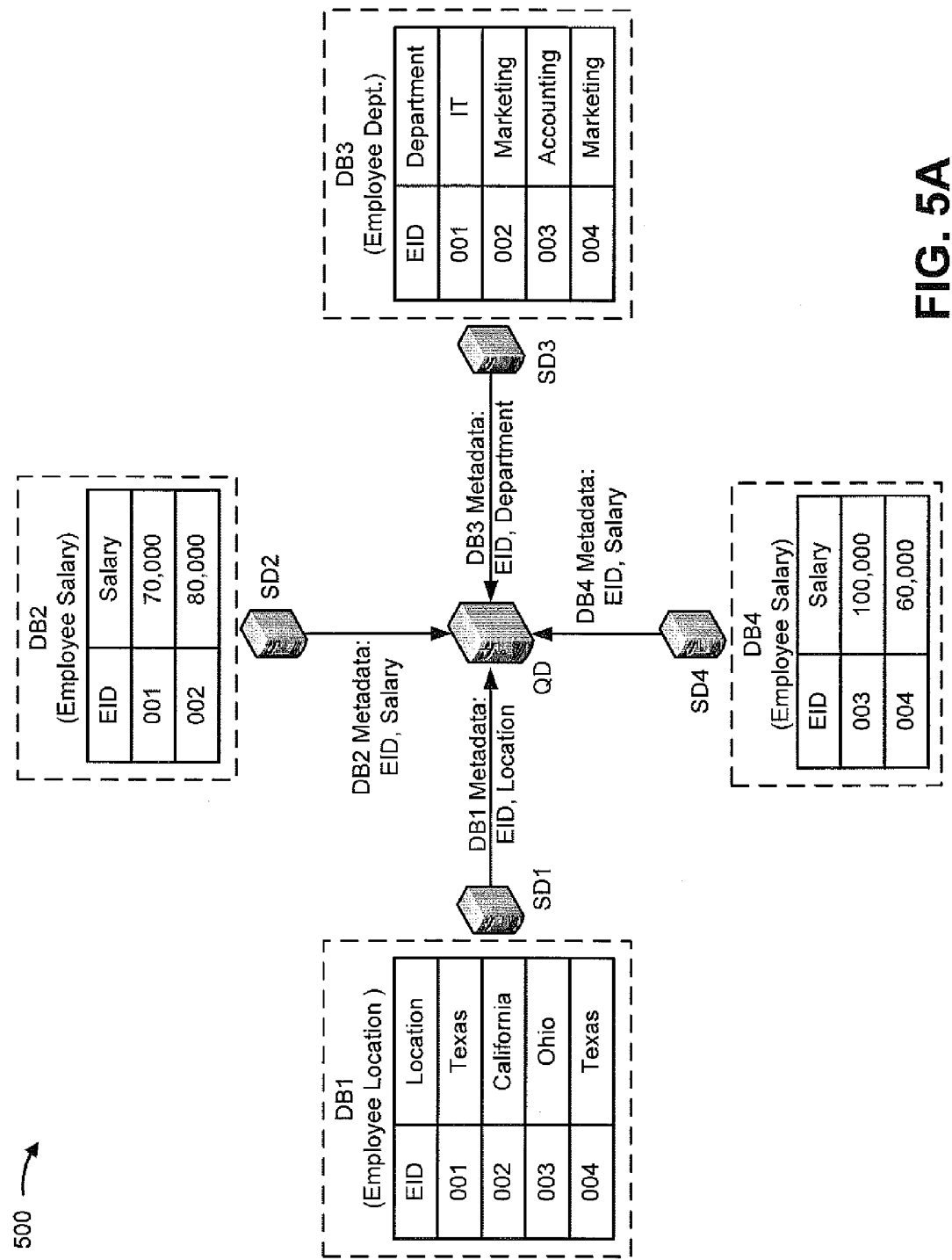
FIGS. 5A and 5B are diagrams of an example implementation relating to the example process shown in FIG. 4.
Figure 5B:
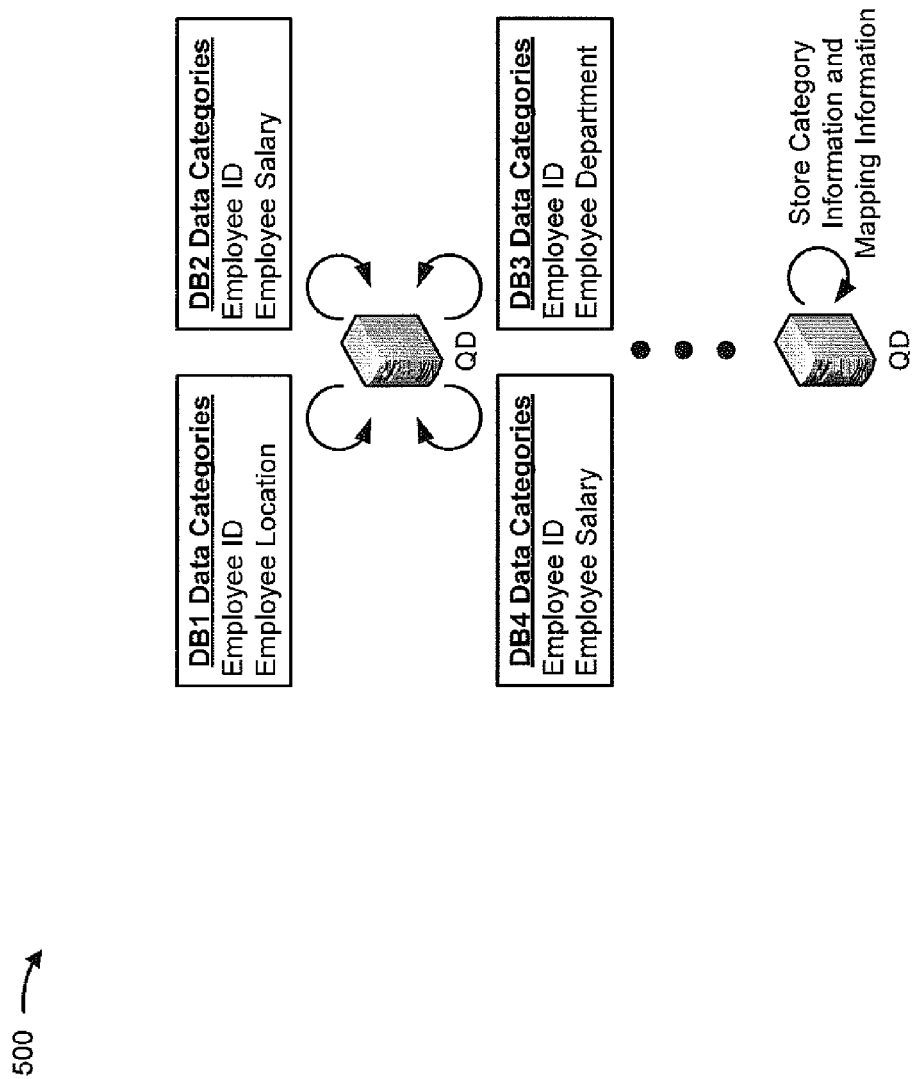

FIGS. 5A and 5B are diagrams of an example implementation 500 relating to example process 400 shown in FIG. 4. For the purposes of example implementation 500, assume that each server device included in a group of server devices (e.g., SD1 through SD4) stores a different database, and that each database includes data associated with employees of a company. Further, assume that a query device, QD, is positioned to communicate with each of the server devices such that QD may receive metadata information associated with each database.

As shown in FIG. 5A, a first database, DB1, may store information associated with a group of employee identification ("EID") numbers and information that identifies a location associated with each corresponding EID number. As shown, a second database, DB2, may store information associated with the group of EID numbers and information that identifies a salary associated with each corresponding EID number. As further shown, a third database, DB3, may store information associated with the group of EID numbers and information that identifies a department associated with each corresponding EID number. As further shown, a fourth database, DB4, may store information associated with the group of EID numbers and information that identifies a salary associated with each corresponding EID number.

As further shown in FIG. 5A, QD may receive, from SD1, metadata information included in DB1 (e.g., a first field name, "EID", and a second field name "Location"). As shown, QD may also receive, from SD2, metadata information included in DB2 (e.g., a first field name, "EID", and a second field name "Salary"). As further shown, QD may receive, from SD3, metadata information included in DB3 (e.g., a first field name, "EID", and a second field name "Department"). As also shown, QD may receive, from SD4, metadata information included in DB4 (e.g., a first field name, "EID", and a second field name "Salary").

As shown in FIG. 5B, QD may receive the metadata information (e.g., the field names) from each of the server devices, and QD may identify (e.g., based on the field names received from each server device) a set of categories of data associated with each database. As shown, QD may identify an employee ID category of data and an employee location category of data as being included in DB1. As further shown, QD may identify the employee ID category of data and an employee salary category of data as being included in DB2. As shown, QD may identify the employee ID category of data and an employee department category of data as being included in DB3. As also shown, QD may identify the employee ID category of data and the employee salary category of data as being included in DB4. As further shown, QD may store information that identifies the each category of data included in DB1 through DB4, along with mapping information (e.g., such that QD may read the data at a later time when performing a query).

As indicated above, FIGS. 5A and 5B are provided merely as an example. Other examples are possible and may differ from what was described with regard to FIGS. 5A and 5B.

FIG. 6 is a flow chart of an example process 600 for receiving and storing information associated with a graphical database query that is based on a category of data included in a database. In some implementations, one or more process blocks of FIG. 6 may be performed by user device 210. In some implementations, one or more process blocks of FIG. 6 may be performed by another device or a group of devices separate from or including user device 210, such as query device 230 and/or server device 240.

As shown in FIG. 6, process 600 may include determining information that identifies a category of data associated with building a graphical query (block 610). For example, user device 210 may determine information that identifies a category of data associated with building a graphical query. In some implementations, user device 210 may determine the information that identifies the category of data when user device 210 receives information (e.g., user input) indicating that a user of user device 210 wishes to build a graphical query (e.g., using a graphical query builder application hosted by user device 210 and/or query device 230). Additionally, or alternatively, user device 210 may determine the information that identifies the category of data when user device 210 executes the graphical query builder application (e.g., when user device 210 starts executing the application). Additionally, or alternatively, user device 210 may determine the information that identifies the category of data when user device 210 receives information, indicating that user device 210 is to determine the information that identifies the category of data, from another device (e.g., query device 230, server device 240, etc.).

In some implementations, user device 210 may determine the information that identifies the category of data based on information received from query device 230. For example, user device 210 may send, to query device 230 (e.g., when query device 230 stores the information that identifies the category of data), a request to provide the information, and user device 210 may determine the information that identifies the category of data based on the information received from query device 230.

Additionally, or alternatively, user device 210 may determine the information that identifies the category of data based on information stored by user device 210 (e.g., when user device 210 stores the information that identifies the category of data. Additionally, or alternatively, user device 210 may determine the information that identifies the category of data based on information received from another device (e.g., server device 240).

In some implementations, the information that identifies the category of data may be used by the graphical query builder application such that the user of user device 210 may build a graphical query based on the category of data (e.g., when the user wishes to build the graphical query based on the category). In some implementations, user device 210 may determine information that identifies a group of categories of data (e.g., when one or more portions of data, included in a database stored by server device 240, is associated with one or more categories of data). In some implementations, user device 210 may determine the information that identifies the group of categories and the user may select (e.g., via input provided to user device 210) a set of categories included in the group of categories that the user wishes to use within the graphical query builder application (e.g., when the user wishes to use only the selected set of categories to build the graphical query).

As further shown in FIG. 6, process 600 may include presenting, for display, a user interface associated with building the graphical query based on the category of data (block 620). For example, user device 210 may present, for display, a user interface associated with building the graphical query based on the category of data. In some implementations, user device 210 may present the user interface when user device 210 determines the information that identifies the category of data (e.g., after user device 210 determines the information that identifies the category of data). Additionally, or alternatively, user device 210 may present the user interface when user device 210 receives information, indicating that user device 210 is to present the user interface, from another device (e.g., query device 230, server device 240, etc.).

In some implementations, user device 210 may present, for display, a user interface (e.g., via a graphical query builder application) that allows the user to build the graphical query. For example, user device 210 may present, for display, a user interface that includes one or more input elements (e.g., a text box, a radio button, a check box, a drop down menu, a button, etc.) that allow the user to provide input associated with building the graphical query.

Additionally, or alternatively, the user interface may include the information that identifies a group of categories of data. For example, user device 210 may present, for display, a user interface that includes information that identifies the group of categories of data (e.g., a drop down menu that includes the one or more categories of data) such that the user may select one or more categories of the group of categories of data to be included in the graphical query.

Additionally, or alternatively, the user interface may include information that identifies one or more operators (e.g., AND, OR, IN, GREATER THAN, LESS THAN, EQUAL, etc.) associated with filtering data based on a condition specified by the user. For example, user device 210 may present, for display a user interface that includes information that identifies one or more operators (e.g., a drop down menu) such that the user may select an operator to be included in the graphical query.

As further shown in FIG. 6, process 600 may include receiving, via the user interface, input associated with building the graphical query (block 630). For example, user device 210 may receive, via the user interface, input associated with building the graphical query. In some implementations, user device 210 may receive the input when user device 210 presents the user interface for display (e.g., after user device 210 displays the user interface). Additionally, or alternatively, user device 210 may receive the input when the user provides the input (e.g., via an input component associated with user device 210, such as a keyboard, a mouse, a touch screen, etc.).

In some implementations, the input, associated with building the graphical query, may cause user device 210 to display a visual representation of a portion of the graphical query associated with the input (e.g., the user interface may display a portion of the graphical query as the user provides the input). In some implementations, the graphical query (e.g., generated based on the input from the user) may be displayed in the form of a visual tree that contains elements associated with portions of the graphical query (e.g., an element associated with a category, an element associated with an operator, etc.). Additionally, or alternatively, the graphical query may be displayed in another visual form.

In this way, the user may build a graphical query (e.g., a visual representation of a query) without requiring the user to have knowledge regarding program code that may be used to generate the query (e.g., the user will not be required to provide program code associated with an SQL query). This may allow the user to easily create complex queries based on a number of categories of data selected by the user.

In some implementations, the user of user device 210 may wish to receive data that is responsive to the graphical query, and user device 210 may provide the information associated with the graphical query to query device 230. Query device 230 may receive the information associated with the graphical query, may convert the graphical query into a query that may be used to search the database (e.g., based on mapping information, stored by query device 230, associated with data included in each category of data identified in the query), may output the query such that a database search may be performed, and may provide, to user device 210, a response to the query based on a result of the database search.

As further shown in FIG. 6, process 600 may include providing, for storage, information associated with the graphical query (block 640). For example, user device 210 may provide, for storage, information associated with the graphical query built via the user interface presented by user device 210. In some implementations, user device 210 may provide the information when user device 210 receives the input associated with building the graphical query (e.g., after the user builds the graphical query via the user interface). Additionally, or alternatively, user device 210 may provide the information when user device 210 receives, from the user, input indicating that user device 210 is to provide the information (e.g., when the user provides input indicating that the graphical query is to be stored). Additionally, or alternatively, user device 210 may provide the information when user device 210 receives information, indicating that user device 210 is to provide the information, from a device associated with storing the information associated with the graphical query, such as query device 230 and/or server device 240.

Information associated with the graphical query may include information, based on the input associated with the graphical query, that, when retrieved at a later time, may cause user device 210 to display the graphical query (e.g., such that the graphical query may be performed, modified, altered, etc.). In some implementations, the information associated with the graphical query may include a query identifier (e.g., a string of characters, a query ID number) that identifies the graphical query. In some implementations, user device 210 may provide the information associated with the graphical query to a storage location (e.g., a RAM, a hard disk, etc.) of user device 210 for storage. Additionally, or alternatively, user device 210 may provide the information associated with the graphical query to another device for storage, such as query device 230 and/or server device 240.

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel.

Figure 7A:
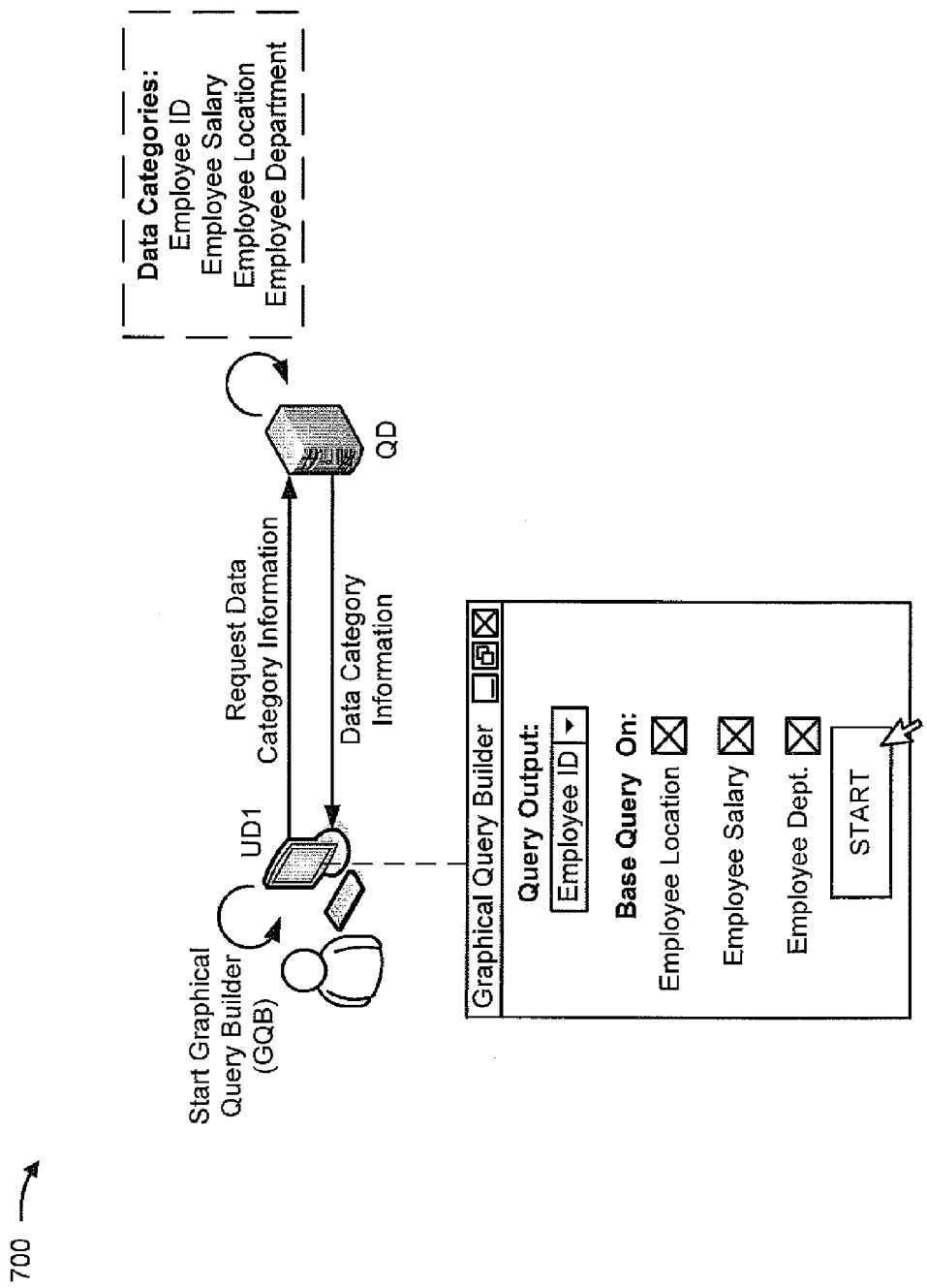
FIGS. 7A-7C are diagrams of an example implementation relating to the example process shown in FIG. 6.
Figure 7B:
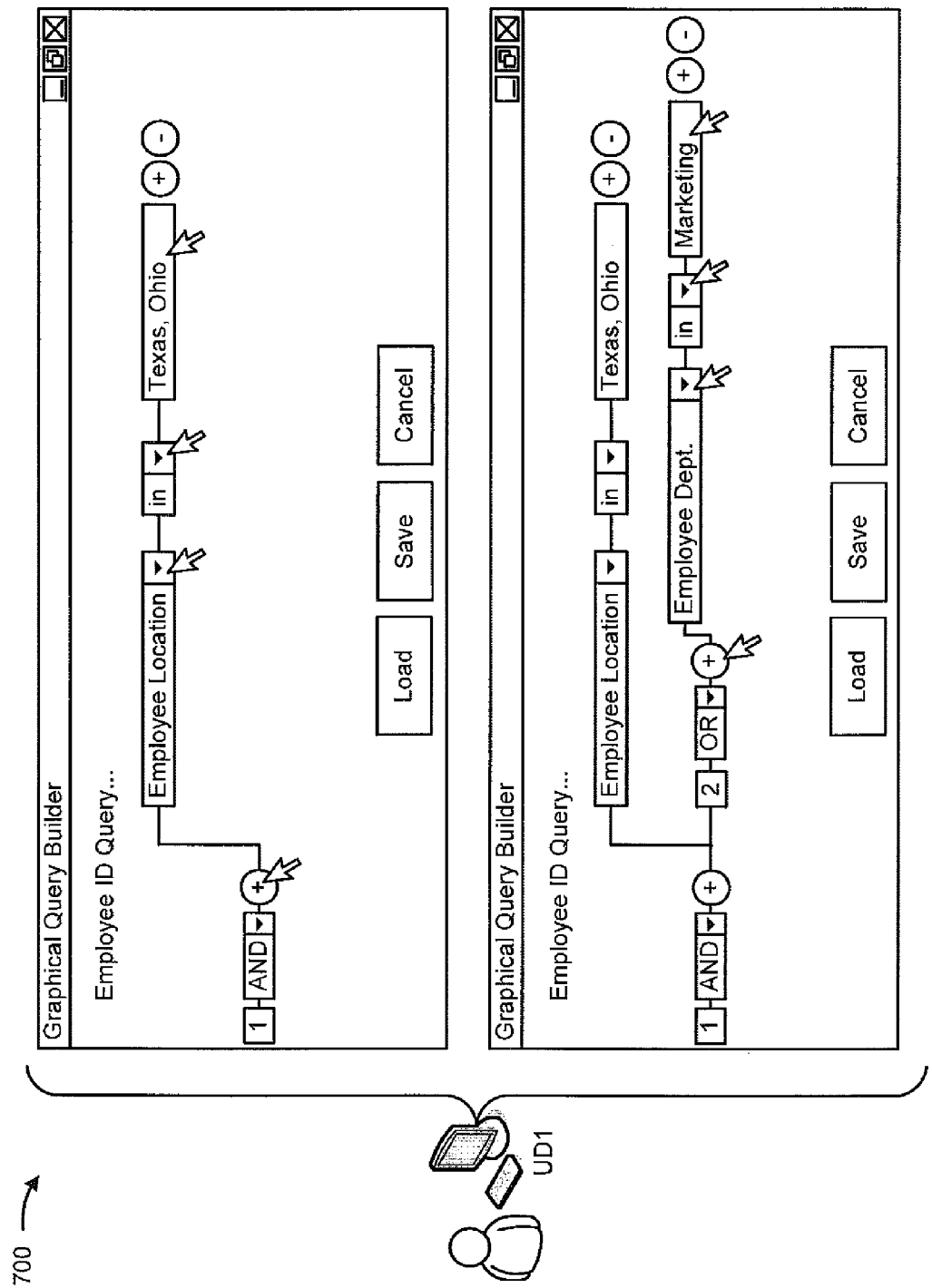
Figure 7C:
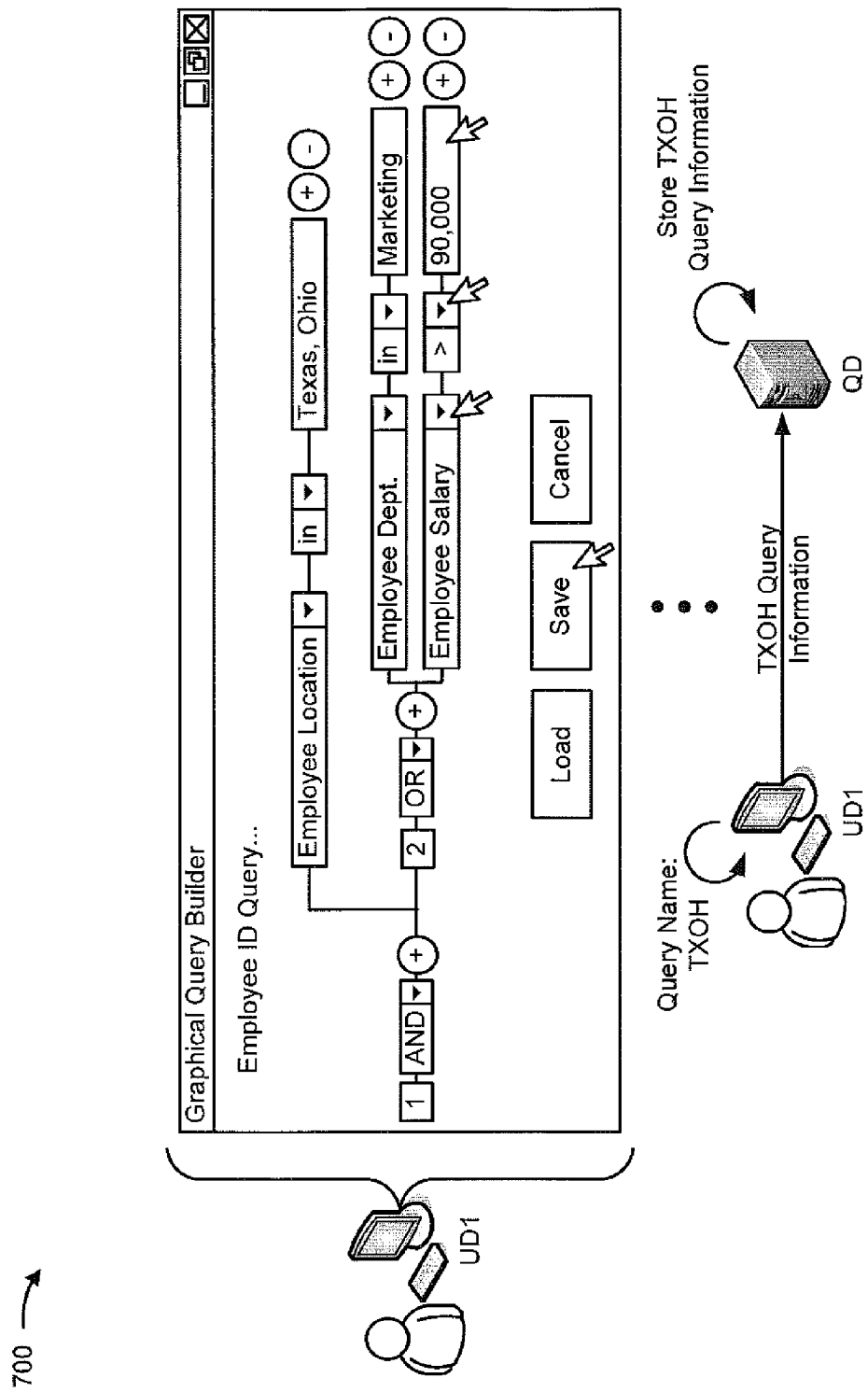

FIGS. 7A-7C are diagrams of an example implementation 700 relating to example process 600 shown in FIG. 6. For the purposes of example implementation 700, assume that a user device, UD1, stores information associated with a graphical query builder application that may be used to build a graphical query. Further, assume that a query device, QD, stores information that identifies a group of categories, associated with a group of databases (e.g., stored by a group of server devices), that may be used to build the graphical query.

As shown in FIG. 7A, UD1 may execute (e.g., based on input from the user) the graphical query builder application, and UD1 may send, to QD, a request associated with determining information that identifies one or more categories of data that may be used to build the graphical query. As shown, QD may receive the request, and may determine (e.g., based on information stored by QD) information that identifies four categories of data that may be used to build the graphical query. As shown, the four categories of data may include an employee ID category, an employee salary category, an employee location category, and an employee department category. As further shown, QD may provide the information that identifies each category of data to UD1.

As further shown in FIG. 7A, UD1 may receive the information that identifies each of the four categories, and UD1 may provide (e.g., via a user interface associated with the graphical query builder application) the information that identifies the four categories. As further shown, the user may provide (e.g., via a drop down menu, via a group of check boxes) input indicating that the user wishes to build a graphical query that determines data associated with one or more employee IDs based on data associated with an employee location (e.g., associated with each employee ID), an employee department (e.g., associated with each employee ID), and an employee salary (e.g., associated with each employee ID). As shown, the user may indicate that the user wishes to begin building the graphical query (e.g., by selecting a START button).

As shown in FIG. 7B, user device 210 may present, for display, a user interface associated with building the employee ID query, and the user may provide input associated with building the graphical query. As shown, the user may provide (e.g., via drop down menus, via a text box) input indicating that a first branch of the graphical query is to include all employee IDs associated with an employee location in Texas or Ohio. As further shown, the user may provide (e.g., by selecting a "+" button) input indicating that the user wishes to add a second branch (e.g., an AND branch) to the first branch of the graphical query.

As further shown in FIG. 7B, the user may provide (e.g., via drop down menus, via a text box) input indicating that the second branch of the graphical query is to include all employee IDs associated with an employee department in marketing. As further shown, the user may provide (e.g., by selecting a "+" button) input indicating that the user wishes to add a third branch (e.g., an OR branch) to the second branch of the graphical query.

As shown in FIG. 7C, the user may provide input (e.g., via drop down menus, via a text box) indicating that the third branch of the graphical query is to include all employee IDs associated with a salary greater than $90,000. As shown, the three branches of the graphical query may be used to determine a group of employee IDs (e.g., that identify employees of a company) located in Texas or Ohio that are associated with a marketing department, or a group of employee IDs (e.g., that identify employees of a company) located in Texas or Ohio that are associated with a salary greater than $90,000.

As further shown in FIG. 7C, the user may provide input (e.g., via a Save button) indicating that the graphical query is to be stored (e.g., such that the user may retrieve the graphical query at a later time). As shown, the user may provide an identifier for the graphical query (e.g., "TXOH") and UD1 may provide information associated with the TXOH graphical query to QD. As shown, QD may receive the information associated with the TXOH graphical query, and QD may store the information.

As indicated above, FIGS. 7A-7C are provided merely as an example. Other examples are possible and may differ from what was described with regard to FIGS. 7A-7C.

FIG. 8 is a flow chart of an example process 800 for determining and displaying information associated with a stored graphical query. In some implementations, one or more process blocks of FIG. 8 may be performed by user device 210. In some implementations, one or more process blocks of FIG. 8 may be performed by another device or a group of devices separate from or including user device 210, such as query device 230 and/or server device 240.

As shown in FIG. 8, process 800 may include receiving information associated with loading a stored graphical query (block 810). For example, user device 210 may receive information associated with loading a graphical query stored by query device 230. In some implementations, user device 210 may receive the information when a user, associated with user device 210, provides (e.g., via an input component of user device 210) information associated with loading the graphical query.

In some implementations, information associated with loading a graphical query may include information indicating that a user of user device 210 wishes to retrieve (e.g., from storage) information associated with a graphical query (e.g., such that the user may modify the information associated with the graphical query, such that the user may add the information associated with the graphical query to another graphical query, etc.). In some implementations, the information associated with loading the graphical query may include a query identifier (e.g., a string of characters, a query ID number, etc.) that identifies the graphical query. Additionally, or alternatively, the information associated with loading the graphical query may include information that identifies a storage location (e.g., a file path that identifies a storage location, etc.) of the stored graphical query.

As further shown in FIG. 8, process 800 may include determining information associated with the stored graphical query (block 820). For example, user device 210 may determine information associated with the stored graphical query. In some implementations, user device 210 may determine the information associated with the stored graphical query when user device 210 receives the information associated with loading the stored graphical query. Additionally, or alternatively, user device 210 may determine the information associated with the stored graphical query when user device 210 receives information, indicating that user device 210 is to determine the information associated with the stored graphical query, from another device (e.g., query device 230, server device 240, etc.).

In some implementations, user device 210 may determine the information associated with the stored graphical query based on the information associated with loading the stored graphical query. For example, the information associated with loading the stored graphical query may include information that identifies the stored graphical query (e.g., a query identifier, a file path, etc.), and user device 210 may determine the information associated with the stored graphical query based on the information that identifies the stored graphical query.

Additionally, or alternatively, user device 210 may determine the information associated with the stored graphical query based on information stored by query device 230. For example, user device 210 may receive information indicating that query device 230 stores the information associated with the stored graphical query, and user device 210 may send, to query device 230, a request to provide the information associated with the stored graphical query. Additionally, or alternatively, user device 210 may determine the information associated with the stored graphical query based on information stored by another device (e.g., server device 240).

As shown in FIG. 8, process 800 may include presenting, for display, the information associated with the stored graphical query (block 830). For example, user device 210 may present, for display, the information associated with the stored graphical query. In some implementations, user device 210 may present the information associated with the stored graphical query when user device 210 determines the information associated with the stored graphical query. Additionally, or alternatively, user device 210 may present the information associated with the stored graphical query when user device 210 receives information, indicating that user device 210 is to present the information associated with the stored graphical query, from another device (e.g., query device 230, server device 240, etc.).

In some implementations, user device 210 may present, for display, the information associated with the stored graphical query to allow the user to modify the information associated with the stored graphical query (e.g., when the user wishes to add and/or remove information to and/or from the information associated with the stored graphical query).

Additionally, or alternatively, user device 210 may present the information associated with the stored graphical query to allow the user (e.g., via query device 230) to perform a query identified by the information associated with the stored graphical query (e.g., when the user wishes to receive data that is responsive to the query).

Additionally, or alternatively, user device 210 may present the information associated with the stored graphical query to allow the user to add the information associated with the stored graphical query to other information associated with another graphical query (e.g., when the user wishes to combine two queries, etc.).

In this way, a user, associated with user device 210, may retrieve information associated with a stored graphical query. This may allow the user to build queries efficiently (e.g., a user will not be required to rebuild a stored graphical query), and may promote consistency and/or accuracy when building queries (e.g., since the information associated with the stored graphical query will be identical each time the information is retrieved from storage).

Although FIG. 8 shows example blocks of process 800, in some implementations, process 800 may include additional blocks, different blocks, fewer blocks, or differently arranged blocks than those depicted in FIG. 8. Additionally, or alternatively, one or more of the blocks of process 800 may be performed in parallel.

Figure 9A:
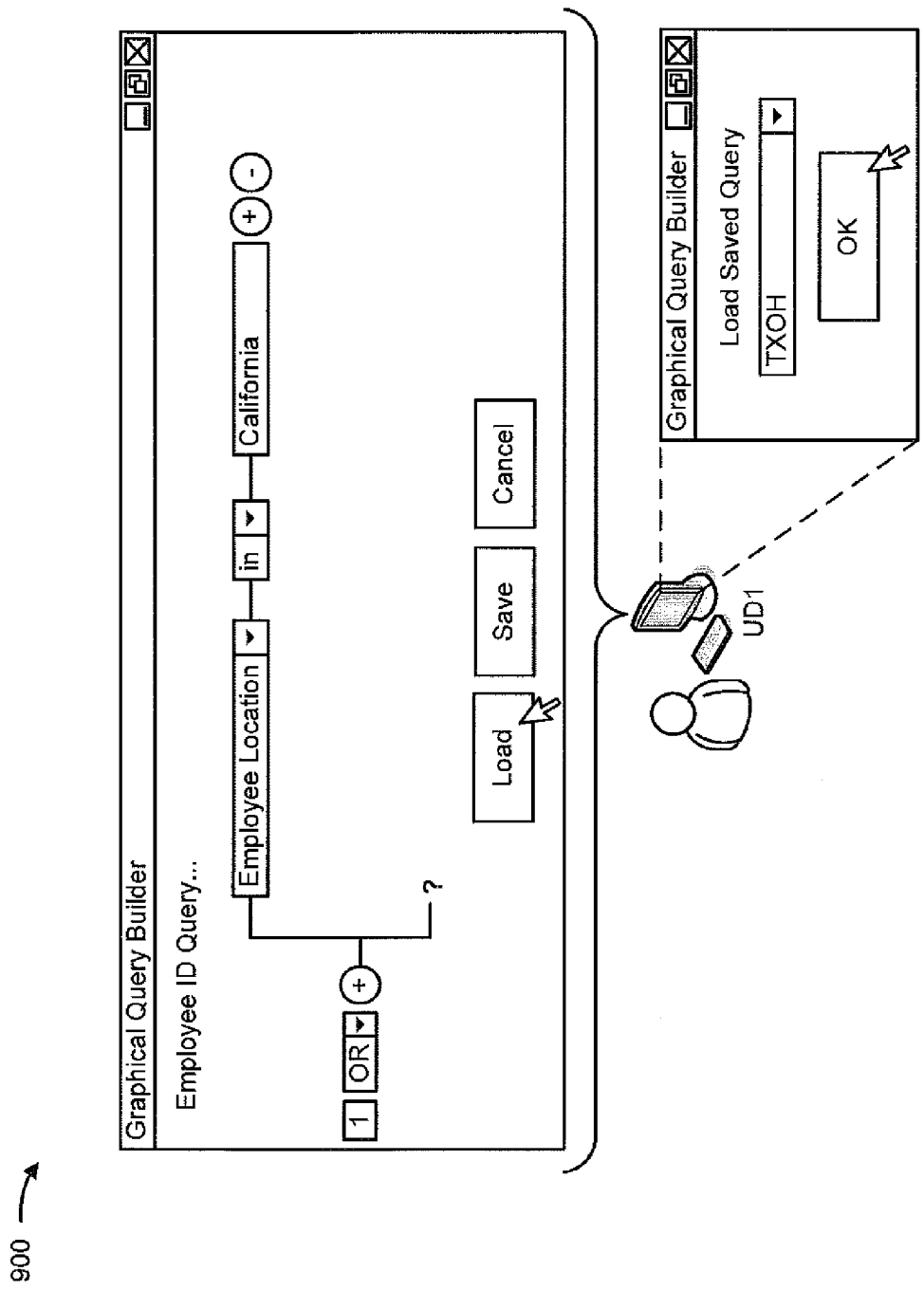
FIGS. 9A and 9B are diagrams of an example implementation relating to the example process shown in FIG. 8.
Figure 9B:
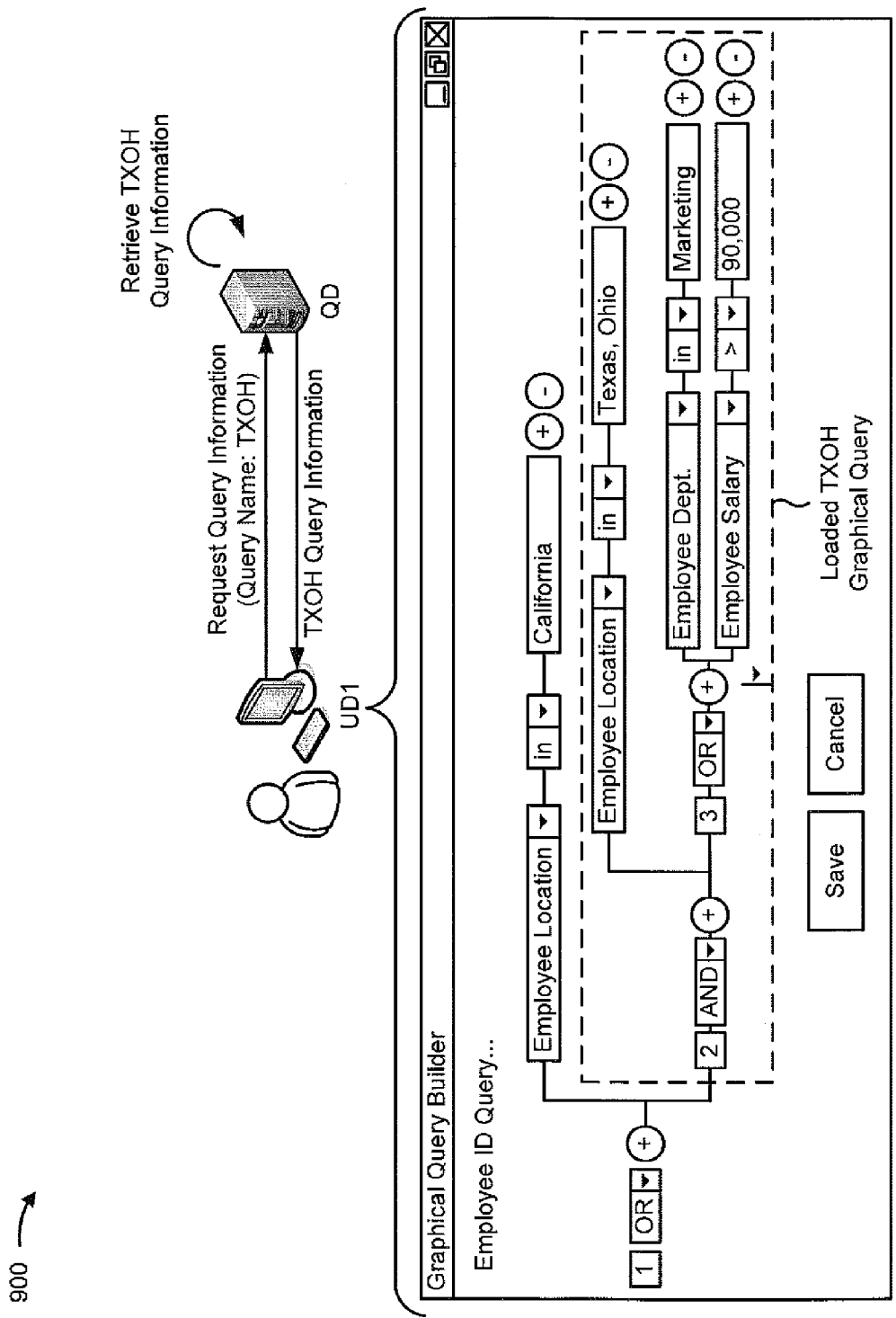

FIGS. 9A and 9B are diagrams of an example implementation 900 relating to example process 800 shown in FIG. 8. For the purposes of example implementation 900, assume that a user of a user device, UD1, wishes to build a graphical query (e.g., via a graphical query builder application running on UD1). Further, assume that a query device, QD, stores information associated with a stored graphical query, identified as TXOH.

As shown in FIG. 9A, the user may provide (e.g., via UD1) input associated with building the graphical query. As shown, the user may provide input (e.g., via drop down menus, via a text box) indicating that a first branch of the graphical query is to determine all employee IDs associated with an employee location in California.

As further shown, the user may indicate (e.g., by selecting a Load button), that the user wishes to retrieve information associated with a stored graphical query (e.g., such that the stored graphical query may be added to the graphical query built by the user). As further shown, the user may select (e.g., via a drop down menu) information that identifies the TXOH stored graphical query (e.g., when UD1 stores information that identifies the stored graphical query). As shown, the user may select a stored graphical query, identified as TXOH, and may indicate (e.g., by clicking an OK button) that the user wishes to load the TXOH graphical query.

As shown in FIG. 9B, UD1 may determine information associated with the stored TXOH graphical query by sending, to QD, a request that includes the information that identifies the TXOH graphical query. As further shown, QD may retrieve the request associated with the stored graphical query, and may provide information associated with the graphical query to UD1. As further shown, UD1 may display the TXOH graphical query based on receiving the information associated with the stored TXOH graphical query (e.g., via the graphical query builder) such that the stored TXOH graphical query has been added to the graphical query built by the user.

As indicated above, FIGS. 9A and 9B are provided merely as an example. Other examples are possible and may differ from what was described with regard to FIGS. 9A and 9B.

Implementations described herein may allow a user to generate (e.g., via a user device) a graphical database query without requiring the user to generate program code associated with the database query. Implementations described herein may also allow the graphical database query to be stored (e.g., such that the graphical database query may be retrieved and used at a later time).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A system, comprising:
one or more devices configured to:
determine metadata information associated with data included in a data structure;
identify a category, associated with the data, based on the metadata information;
present, for display, a user interface that allows a user to build a graphical query based on the category,
the graphical query including a user-defined visual representation of a data structure query associated with the data,
the user interface including one or more input elements that allow the user to build the graphical query,
at least one input element of the one or more input elements being associated with information that identifies a group of categories including the category, and
at least one other input element of the one or more input elements being associated with information that identifies one or more operators associated with filtering the data;
receive information associated with the graphical query based on presenting the user interface,
the information associated with the graphical query being received based on input provided via the user interface, and
the information associated with the graphical query including information associated with the category;
present, for display, the information associated with the graphical query by creating a visual tree,
the visual tree including at least one representation of the category and at least one representation of an operator of the one or more operators; and
provide, to a query device, the information associated with the graphical query to cause the query device to convert the graphical query into the data structure query, and without requiring the user to generate the data structure query.

2. The system of claim 1, where the one or more devices are further configured to:
store information associated with the category based on identifying the category; and
where the one or more devices, when presenting, for display, the user interface that allows the user to build the graphical query based on the category, are configured to:
present, within the user interface, the stored information associated with the category.

3. The system of claim 1, where the one or more input elements can be manipulated by the user to allow the user to build the graphical query.

4. The system of claim 1, where the one or more input elements include at least one of:
a drop down menu associated with building the graphical query;
a text box associated with building the graphical query;
a check box associated with building the graphical query; or
a button associated with building the graphical query.

5. The system of claim 1, where the one or more devices are further configured to:
receive the information that identifies the group of categories.

6. The system of claim 1, where the one or more devices, when providing the information associated with the graphical query, are configured to:
provide the information associated with the graphical query to a device associated with storing the information associated with the graphical query.

7. The system of claim 1, where the one or more devices are further configured to:
determine information associated with a stored graphical query; and
where the one or more devices, when presenting, for display, the user interface are configured to:
present, for display, the information associated with the stored graphical query.

8. A non-transitory computer-readable medium storing instructions, the instructions comprising:
one or more instructions that, when executed by one or more processors, cause the one or more processors to:
receive metadata associated with data stored in a data structure;
determine, based on the metadata, a category associated with the data;
present, for display, a user interface associated with building a graphical query based on the category, the graphical query including a visual representation of a data structure query used to search the data in the data structure, the user interface including one or more input elements that allow a user to build the graphical query, at least one input element of the one or more input elements being associated with information that identifies a group of categories including the category, and at least one other input element of the one or more input elements being associated with information that identifies one or more operators associated with filtering the data;

receive information associated with the graphical query via the user interface, the information associated with the graphical query including information indicating the data structure query is to be based on the category;

present, for display, the information associated with the graphical query by creating a visual tree, the visual tree including at least one representation of the category and at least one representation of an operator of the one or more operators; and provide, to a query device, the information associated with the graphical query to cause the query device to convert the graphical query into the data structure query, and without requiring the user to generate the data structure query.

9. The non-transitory computer-readable medium of claim 8, where the one or more instructions, when executed by the one or more processors, further cause the one or more processors to:

store information associated with the category based on determining the category; and where the one or more instructions, that cause the one or more processors to present, for display, the user interface associated with building the graphical query, cause the one or more processors to:

present, for display within the user interface, the stored information associated with the category.

10. The non-transitory computer-readable medium of claim 8, where the one or more input elements can be manipulated by the user to allow the user to build the graphical query.

11. The non-transitory computer-readable medium of claim 8, where the one or more instructions, when executed by the one or more processors, further cause the one or more processors to:

receive the information associated with the graphical query;

convert the information associated with the graphical query into the data structure query used to search the data structure;

output the data structure query such that a data structure search may be performed based on the data structure query; and provide a response to the data structure query based on a result of the data structure search.

12. The non-transitory computer-readable medium of claim 8, where the one or more instructions, when executed by the one or more processors, further cause the one or more processors to:

receive the information that identifies the group of categories.

13. The non-transitory computer-readable medium of claim 8, where the one or more instructions, that cause the one or more processors to provide the information associated with the graphical query, cause the one or more processors to:

provide the information associated with the graphical query to a device associated with storing the information associated with the graphical query.

14. The non-transitory computer-readable medium of claim 8, where the one or more instructions, when executed by the one or more processors, further cause the one or more processors to:

determine information associated with a stored graphical query; and where the one or more instructions, that cause the one or more processors to present, for display, the user interface associated with building the graphical query, cause the one or more processors to:

present, for display, the information associated with the stored graphical query.

15. A method, comprising:

determining, by one or more devices, information associated with data included in a data structure;

identifying, by the one or more devices, a category of the data based on the information associated with the data;

presenting, by the one or more devices, a user interface for building a graphical query, the graphical query including a visual representation that identifies a query associated with the data, the user interface including one or more input elements that allow a user to build the graphical query, at least one input element of the one or more input elements being associated with information that identifies a group of categories including the category, and at least one other input element of the one or more input elements being associated with information that identifies one or more operators associated with filtering the data; and receiving, by the one or more devices, information associated with the graphical query via the user interface, the information associated with the graphical query including information associated with the category of the data;

presenting, for display and by the one or more devices, the information associated with the graphical query by creating a visual tree, the visual tree including at least one representation of the category and at least one representation of an operator of the one or more operators;

causing, by the one or more devices, the information associated with the graphical query to be stored; and providing, by the one or more devices and to a query device, the information associated with the graphical query to cause the query device to convert the graphical query into the query, and without requiring the user to generate the query.

16. The method of claim 15, further comprising:

storing information associated with the category based on identifying the category; and where presenting the user interface for building the graphical query comprises:

presenting, within the user interface, the stored information associated with the category.

17. The method of claim 15, where the one or more input elements can be selected by a user to allow the user to build the graphical query.

18. The method of claim 15, where the one or more input elements include at least one of:

a drop down menu associated with building the graphical query;

a text box associated with building the graphical query;

a check box associated with building the graphical query; or a button associated with building the graphical query.

19. The method of claim 15, further comprising:
receiving the information that identifies the group of categories.

20. The method of claim 15, further comprising:
determining information associated with a stored graphical query; and where presenting the user interface for building the graphical query comprises:
   presenting the information associated with the stored graphical query.

* * * * *